United States Patent
Tsukada et al.

(10) Patent No.: US 7,191,881 B2
(45) Date of Patent: Mar. 20, 2007

(54) ONE-WAY CLUTCH DEVICE AND MOTORCYCLE USING THE SAME

(75) Inventors: Yoshiaki Tsukada, Wako (JP); Takashi Ozeki, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 119 days.

(21) Appl. No.: 11/002,683

(22) Filed: Dec. 3, 2004

(65) Prior Publication Data

US 2005/0121245 A1    Jun. 9, 2005

(30) Foreign Application Priority Data

Dec. 8, 2003    (JP)    ............... 2003-409156

(51) Int. Cl.
*B62D 61/02*    (2006.01)
*F16D 43/14*    (2006.01)

(52) U.S. Cl. ............... 192/45; 180/219; 192/105 CE

(58) Field of Classification Search ............ None
See application file for complete search history.

(56) References Cited

U.S. PATENT DOCUMENTS

| 2,044,197 | A | * | 6/1936 | Barthel ............ 192/45 |
| 2,215,548 | A | * | 9/1940 | Duffield ............ 192/45 |
| 2,663,397 | A | * | 12/1953 | Scott ............ 192/45 |
| 4,091,903 | A |   | 5/1978 | Seidel et al. |
| 4,273,008 | A | * | 6/1981 | Ishihara et al. ............ 475/13 |
| 4,721,177 | A | * | 1/1988 | Qizhen ............ 180/219 |
| 5,099,972 | A |   | 3/1992 | Ouchi et al. |
| 5,595,273 | A |   | 1/1997 | Endoy et al. |

FOREIGN PATENT DOCUMENTS

| JP | 52100045 A | 8/1977 |
| JP | 60-27854 B2 | 7/1985 |

* cited by examiner

*Primary Examiner*—Rodney H. Bonck
(74) *Attorney, Agent, or Firm*—Birch, Stewart, Kolasch & Birch, LLP

(57) ABSTRACT

To achieve reduction in manufacturing costs of a one-way clutch device and to improve handleability of a motorcycle. A one-way clutch device includes an inner clutch and an outer clutch with rollers which are provided between the clutches. Weight members include weight main bodies coming into contact with the rollers with arm parts rotatably supported by the inner clutch. If the inner clutch rotates at a rotational speed above a predetermined rotational speed, the weight member moves the roller to a position where the roller allows a connection between the inner clutch and the outer clutch. Moreover, in a motorcycle, the inner clutch of the one-way clutch device is connected to an output side of a power transmission medium, and the outer clutch thereof is connected to a drive wheel.

20 Claims, 6 Drawing Sheets

ONE-WAY CLUTCH DEVICE AND MOTORCYCLE USING THE SAME

CROSS-REFERENCE TO RELATED APPLICATIONS

The present non-provisional application claims priority under 35 USC 119 to Japanese Patent Application No. 2003-409156 filed on Dec. 8, 2003 the entire contents thereof is hereby incorporated by reference.

BACKGROUND OF THE INVENTION

1. Field of the Invention

The present invention relates to a one-way clutch device which functions as a one-way clutch depending upon an input rotational speed, and to a motorcycle using the same.

2. Description of the Background Art

A one-way clutch device is known as described, for example, in Japanese Patent Laid-Open No. Sho 60 (1985)-27854. More specifically, in a state where a rotational speed of an input side rotating member is low, even if the input side rotating member and an output side rotating member relatively rotate in any direction, the members run idle. Meanwhile, in a state where the input side rotating member rotates at a rotational speed above a predetermined rotational speed, if the input side rotating member and the output side rotating member relatively rotate in a specific direction, the members are connected to each other, and the rotary power is transmitted from the input side rotating member to the output side rotating member. If the above-described members relatively rotate in a direction opposite to that described above, the members run idle.

The device described above has such a basic configuration as that in a one-way clutch device 144 shown in FIG. 8 of the present drawings, in which a plurality of rollers 186 are housed between an input coupling 144b and an outer race 144a, and the rotary power can be transmitted from the input coupling 144b to the outer race 144a through the respective rollers 186. The respective rollers 186 are energized by springs 194 through plates 194a toward a direction moving away from positions where the springs allow a connection between the input coupling 144b and the outer race 144a.

Meanwhile, between the input coupling 144b and the outer race 144a, auxiliary rollers 187 are provided that correspond to the respective rollers 186. The auxiliary rollers 187 are supported by oblong holes 187a, respectively, which are formed in a sidewall of the input coupling 144b. Each of the auxiliary rollers 187 can be moved along the oblong hole 187a by centrifugal force when the input coupling 144b rotates. Depending upon a rotational speed of the input coupling 144b, the respective auxiliary rollers 187 move the corresponding rollers 186 against elastic force of the springs 194. Thus, the respective rollers 186 are moved to positions where the rollers 186 allow a connection between the input coupling 144b and the outer race 144a. Consequently, the one-way clutch device 144 functions as a one-way clutch. The one-way clutch device 144 as described above can be provided between the engine and the torque converter of a vehicle.

However, in the one-way clutch device as described above, since the auxiliary roller is moved along the oblong hole formed in the sidewall of the input coupling, based on long-term use, a configuration is needed so as to smoothly move the auxiliary roller without causing the auxiliary roller to fall out of the oblong hole. This complicates the configuration of the one-way clutch device. Thus, an improvement in this regard is needed.

At the same time, to improve the handleability of a motorcycle when an engine is stopped or idled it has been considered to employ the one-way clutch device as described above in the motorcycle.

SUMMARY AND OBJECTS OF THE INVENTION

Accordingly, it is an object of the present invention to reduce manufacturing costs of a one-way clutch device configured to function as a one-way clutch depending upon an input rotational speed, and to improve the handleability of a motorcycle by use of such a one-way clutch device.

As a means for solving the foregoing problems, the invention according to the present invention provides a one-way clutch device including an input side rotating member and an output side rotating member which are coaxially arranged with each other. Rollers are provided between the rotating members described above. In a state where the input side rotating member rotates at a rotational speed above a predetermined rotational speed, and if the input side rotating member relatively rotates in a specific direction with respect to the output side rotating member, the one-way clutch device transmits rotary power from the input side rotating member to the output side rotating member by connecting both members to each other by means of the rollers. In the one-way clutch device, weight members are provided in the input side rotating member, and each of the weight members has a weight main body which comes into contact with the roller, and an arm part which is connected to the weight main body and rotatably supported by the input side rotating member. Moreover, when the input side rotating member rotates at a rotational speed above the predetermined rotational speed, the weight members move the rollers to positions where the rollers allow a connection between the input side rotating member and the output side rotating member.

According to the configuration described above, the weight main body can be swung through the arm part with respect to the input side rotating member by centrifugal force when the input side rotating member rotates. Accordingly, when the input side rotating member rotates at a rotational speed above the predetermined rotational speed, the swung weight main body can move the roller to the position where the roller allows the connection between the input side rotating member and the output side rotating member. Thus, the one-way clutch device can be allowed to function as a one-way clutch. In this state, if the input side rotating member relatively rotates in a specific direction with respect to the output side rotating member, the rotary power is transmitted from the input side rotating member to the output side rotating member.

The weight member is operated so as to swing the weight main body with respect to the input side rotating member. Thus, as compared with a conventional one-way clutch device having a configuration in which auxiliary rollers are moved along oblong holes, a smooth operation of the weight member can be maintained without causing the weight member to fall off from the input side rotating member even when used over a long-term.

The present invention includes elastic members which energize the rollers in a direction moving away from the positions where the rollers allow the connection between the input side rotating member and the output side rotating member. If the input side rotating member rotates at a rotational speed above the predetermined rotational speed, the weight members move the rollers against the elastic force of the elastic members.

According to the configuration described above, in a state where the rotational speed of the input side rotating member is low, the centrifugal force when the input side rotating member rotates is small. Therefore, the weight members cannot move the rollers against the elastic force of the elastic members. Accordingly, the rollers remain away from the positions where the rollers allow the connection between the input side rotating member and the output side rotating member. Thus, even if the input side rotating member and the output side rotating member relatively rotate in any direction, these members run idle. Moreover, when the input side rotating member rotates at a rotational speed above the predetermined rotational speed, the swung weight main body can move the rollers against the elastic force of the elastic members. Thus, the one-way clutch device is allowed to function as a one-way clutch.

The present invention provides a motorcycle which includes a motor for outputting rotary power and a power transmission medium for transmitting the rotary power of the motor to a drive wheel. A starter clutch is provided for transmitting the rotary power of the motor to an input side of the power transmission medium if a rotational speed of the motor is not more than a predetermined value. A one-way clutch device is provided in which an input side rotating member is connected to an output side of the power transmission medium, and an output side rotating member is connected to the drive wheel. In a state where the input side rotating member is rotated by the rotary power from the motor at a rotational speed above a predetermined rotational speed, and if the input side rotating member relatively rotates in a direction of rotation by the rotary power of the motor with respect to the output side rotating member, the one-way clutch device transmits the rotary power from the input side rotating member to the output side rotating member. Meanwhile, if the input side rotating member rotates at not more than the predetermined rotational speed, or if the input side rotating member relatively rotates in a direction opposite to the direction of rotation from the rotary power of the motor with respect to the output side rotating member, the one-way clutch device allows the input side rotating member and the output side rotating member to run idle.

According to the configuration described above, if the rotational speed of the motor is not more than a connection rotational speed (the predetermined value) of the starter clutch, such as at the time of idling, the motor is driven without driving the power transmission medium.

Moreover, when the motor rotates at a rotational speed above the predetermined value, the rotary power is transmitted to the input side of the power transmission medium through the starter clutch, and the input side rotating member of the one-way clutch device, which is connected to the output side of the power transmission medium, rotates in the direction of rotation from the rotary power of the motor. If the rotational speed of the input side rotating member in this event is not less than the predetermined value, the rotary power is transmitted from the input side rotating member to the output side rotating member in the one-way clutch device. Thus, the rotary power of the motor, which is transmitted to the power transmission medium, is transmitted to the drive wheel from the one-way clutch device.

Furthermore, in the case where the motorcycle is pushed when the motor is idled, stopped or the like, in first moving the vehicle body forward, the output side rotating member of the one-way clutch device rotates, by rotation of the drive wheel, in the direction of rotation by the rotary power of the motor. In this event, if the connection rotational speed of the starter clutch exceeds an idling rotational speed of the motor, no rotary power of the motor is inputted, and the input side rotating member of the one-way clutch device stops its rotation. Moreover, this input side rotating member relatively rotates in the direction opposite to the direction of rotation by the rotary power of the motor with respect to the output side rotating member. Thus, the input side rotating member and the output side rotating member run idle, and the power transmission medium is not driven.

Moreover, in moving the vehicle body rearwardly, the output side rotating member of the one-way clutch device rotates, by the rotation of the drive wheel, in the direction opposite to the direction of rotation by the rotary power of the motor. Thus, the stopped input side rotating member relatively rotates in the direction of rotation from the rotary power of the motor with respect to the output side rotating member. However, since the input side rotating member has stopped its rotation, as a result, the input side rotating member and the output side rotating member run idle, and the power transmission medium is not driven as in the case of moving the vehicle body forward.

According to the present invention, the durability of the one-way clutch device can be improved. Moreover, compared with a conventional configuration using auxiliary rollers, it is possible to eliminate a configuration of preventing fall-off of the weight member and helping a smooth operation thereof.

According to the present invention, in the state where the rotational speed of the input rotating member is low, even if the input side rotating member and the output side rotating member relatively rotate in any direction, these members are allowed to run idle. Moreover, if the input side rotating member rotates at a rotational speed above the predetermined rotational speed, the one-way clutch device can be allowed to function as a one-way clutch.

According to the present invention, if the rotational speed of the motor is not more than the connection rotational speed of the starter clutch (for example, during warming-up and the like), the power transmission medium is not driven. Accordingly, friction in the motor is reduced, and fuel consumption can be reduced. Moreover, the motor is driven without driving the power transmission medium, and power generation can be performed by a generator provided in the motor. Thus, charging by the motor can be efficiently performed. Furthermore, the motorcycle can be pushed without driving the power transmission medium. Thus, good handleability in pushing the motorcycle can be achieved without the influence of friction in the power transmission medium.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

With reference to the drawings, an embodiment of the present invention will be described below. Note that, in the following description, directions such as front, rear, left and right with respect to the vehicle.

Figure 1:
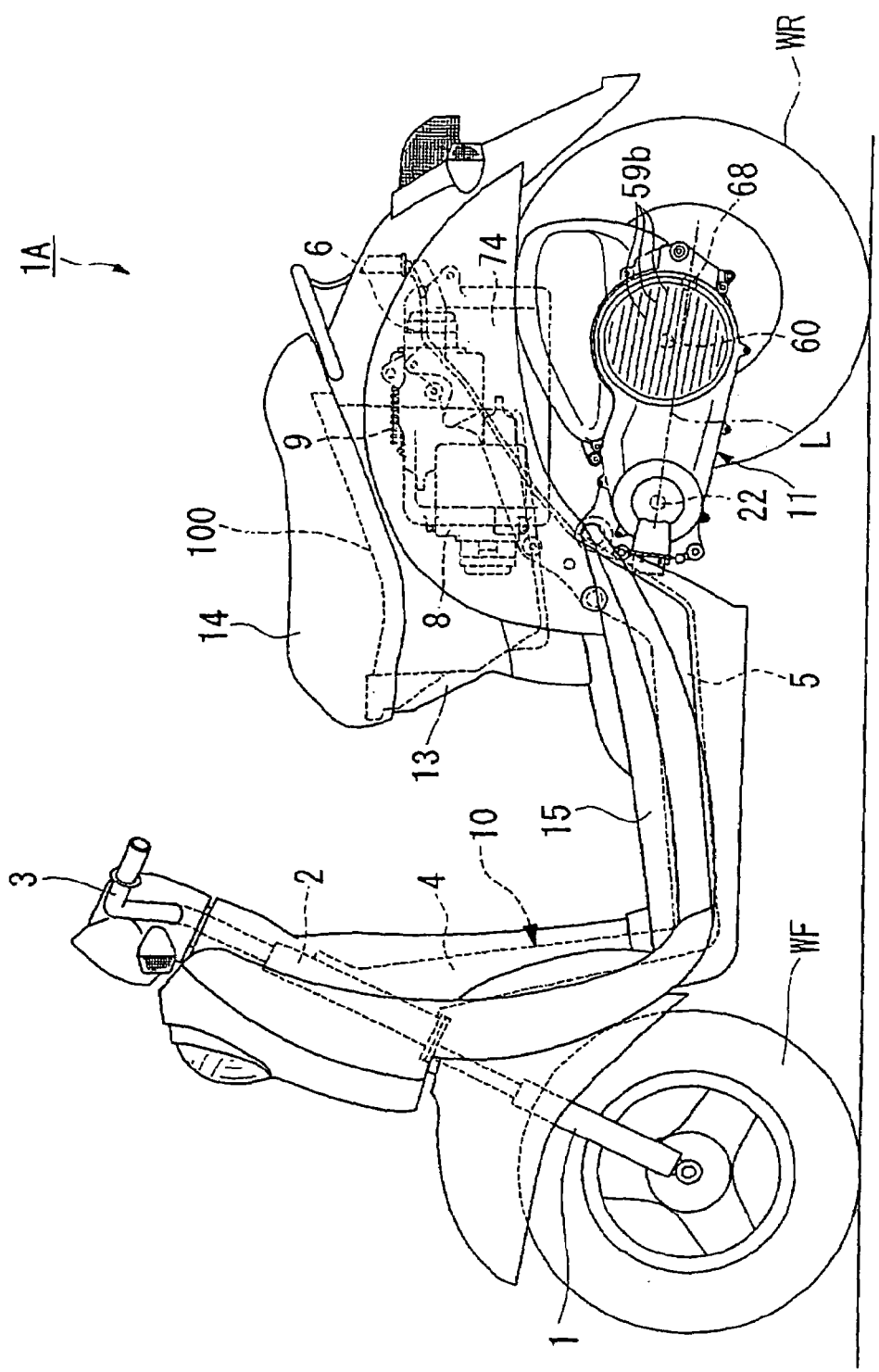
FIG. 1 is a side view of a motorcycle according to an embodiment of the present invention.

In FIG. 1, a unit swing type motorcycle 1A (hereinafter simply referred to as a motorcycle) is provided which is configured as a hybrid vehicle. This motorcycle 1A has a front fork 1 which axially supports a front wheel WF on a front side of a vehicle body. This front wheel WF and the front fork 1 are pivotally supported by a head pipe 2 so as to be steerable by operation of a handlebar 3. A down pipe 4 is attached rearwardly and downwardly from the head pipe 2. From a lower end of the down pipe 4, a mid-frame 5 extends approximately horizontally.

From a rear end of the mid-frame 5, a rear frame 6 is formed rearwardly and upwardly. In a vehicle body frame 10 thus structured, a front end part of a power unit 11 including an engine 20 to be described later, which is a motor that is pivotally fitted on the motorcycle 1A. The power unit 11 is a so-called unit swing type which swings up and down around a front end part of the power unit that is pivotally fitted to the vehicle body frame 10. A rear drive wheel WR is rotatably attached to a rear end part of the power unit 11. Note that an unillustrated rear shock absorber is attached between the power unit 11 and the rear frame 6.

A periphery of the vehicle body frame 10 is covered with a vehicle body cover 13. A seat 14 on which a driver sits is arranged on a rear side of and on an upper surface of the vehicle body cover 13. In front of the seat 14, a step floor 15 is formed, on which the driver puts his/her feet. Below the seat 14, a storage box 100 is provided, which is opened and closed with the seat 14 and functions as a utility space for storing, for example, a helmet, luggage and the like.

Figure 2:
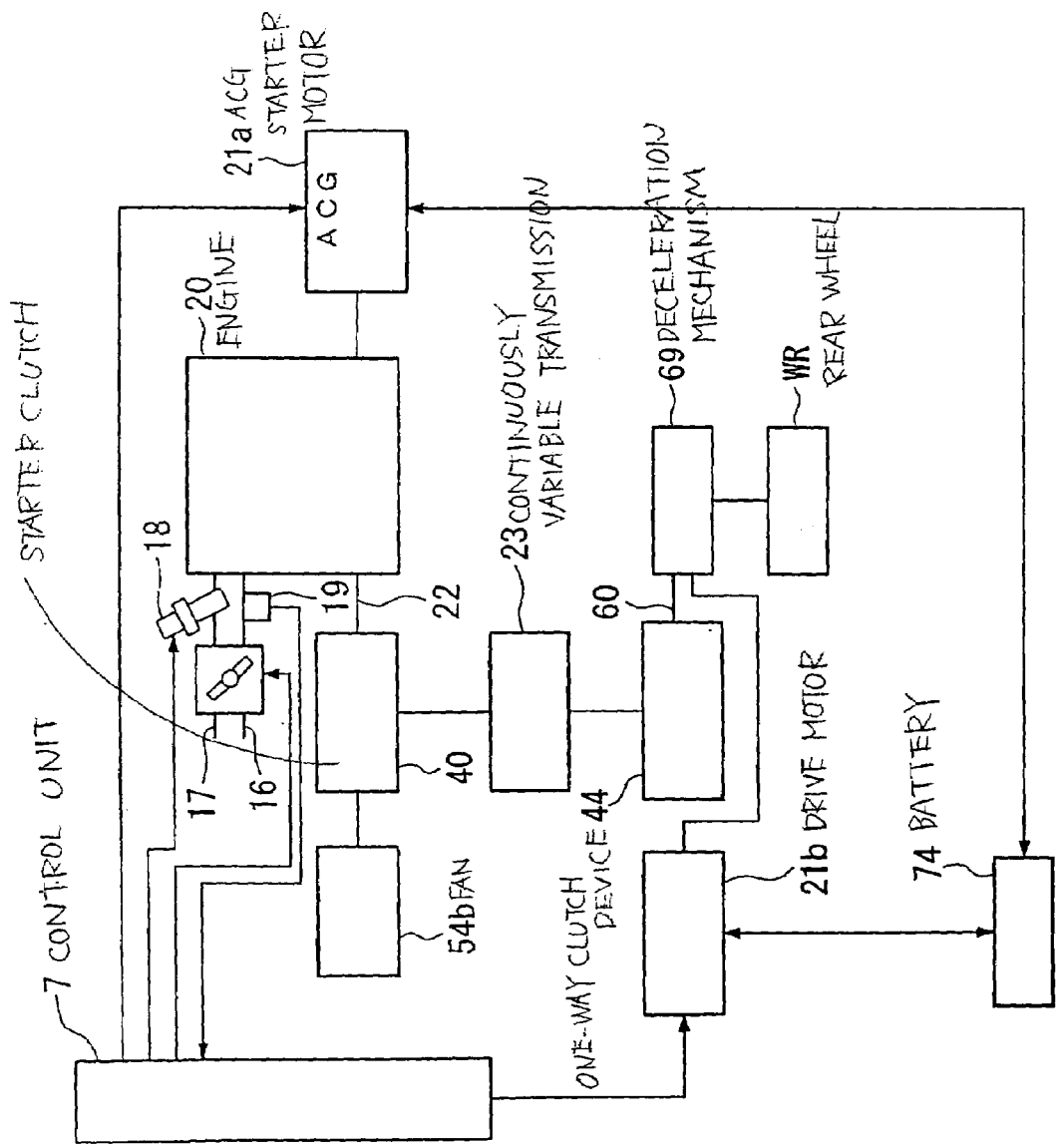
FIG. 2 is a block diagram showing a system configuration of the motorcycle shown in FIG. 1.

As shown in FIG. 2, the power unit 11 includes the engine 20 which is an internal combustion engine that obtains an output by burning a flammable air-fuel mixture for outputting rotary power. An ACG starter motor 21a functions as a starter and a generator with a continuously variable transmission (power transmission medium) 23 which is connected to a crankshaft 22 of the engine 20 and transmits the rotary power of the engine 20 to the rear wheel WR. A starter clutch 40 disconnects or connects power transmission between the crankshaft 22 and an input side of the continuously variable transmission 23. A drive motor 21b functions as a motor or a generator with a one-way clutch device 44 which functions as a one-way clutch capable of transmitting the rotary power from the engine 20 and the drive motor 21b only toward the rear wheel WR side according to an input rotational speed. A deceleration mechanism 69 reduces the rotary power from the continuously variable transmission 23 and transmits the power to the rear wheel WR.

The rotary power from the engine 20 is transmitted from the crankshaft 22 to the rear wheel WR through the starter clutch 40, the continuously variable transmission 23, the one-way clutch device 44, a driven shaft 60 arranged at an output side of the continuously variable transmission 23, and the deceleration mechanism 69.

On the other hand, the power from the drive motor 21b is transmitted to the rear wheel WR through the driven shaft 60 and the deceleration mechanism 69. More specifically, the driven shaft 60 is a drive shaft of the rear wheel WR through the deceleration mechanism 69 and is also an output shaft of the drive motor 21b.

A battery 74 is connected to the ACG starter motor 21a and the drive motor 21b. When the drive motor 21b functions as the generator, and when the ACG starter motor 21a functions as the starter, the battery 74 supplies power to the respective motors 21a and 21b. Meanwhile, when the ACG starter motor 21a and the drive motor 21b function as the generators, regenerative power from the motors is used for charging the battery 74.

Control of the engine 20, the ACG starter motor 21a and the drive motor 21b is performed by a control unit 7 which is control means.

The engine 20 has a configuration of sucking in an air-fuel mixture including air and a fuel from a suction pipe 16 and burning the air-fuel mixture. In the suction pipe 16, a throttle valve 17 is rotatably provided for controlling an amount of air to the engine 20. The throttle valve 17 rotates according to a manipulated variable of an unillustrated throttle grip operated by the driver.

An injector 18 for injecting fuel, and a pressure sensor 19 for detecting a negative pressure (suction pipe pressure) in the suction pipe 16 are provided between the throttle valve 17 and the engine 20. When the throttle grip is significantly operated, the throttle valve 17 is opened wide to allow a large amount of air to flow, and the suction pipe pressure detected by the pressure sensor 19 is reduced. Accordingly, the amounts of the air and fuel which are sucked into the engine 20 are increased. Meanwhile, when the throttle grip is operated slightly, the throttle valve 17 is opened to a small extent to allow a small amount of air to flow, and the suction pipe pressure detected by the pressure sensor 19 is increased. Accordingly, the amounts of the air and fuel which are sucked into the engine 20 are reduced.

Figure 3:
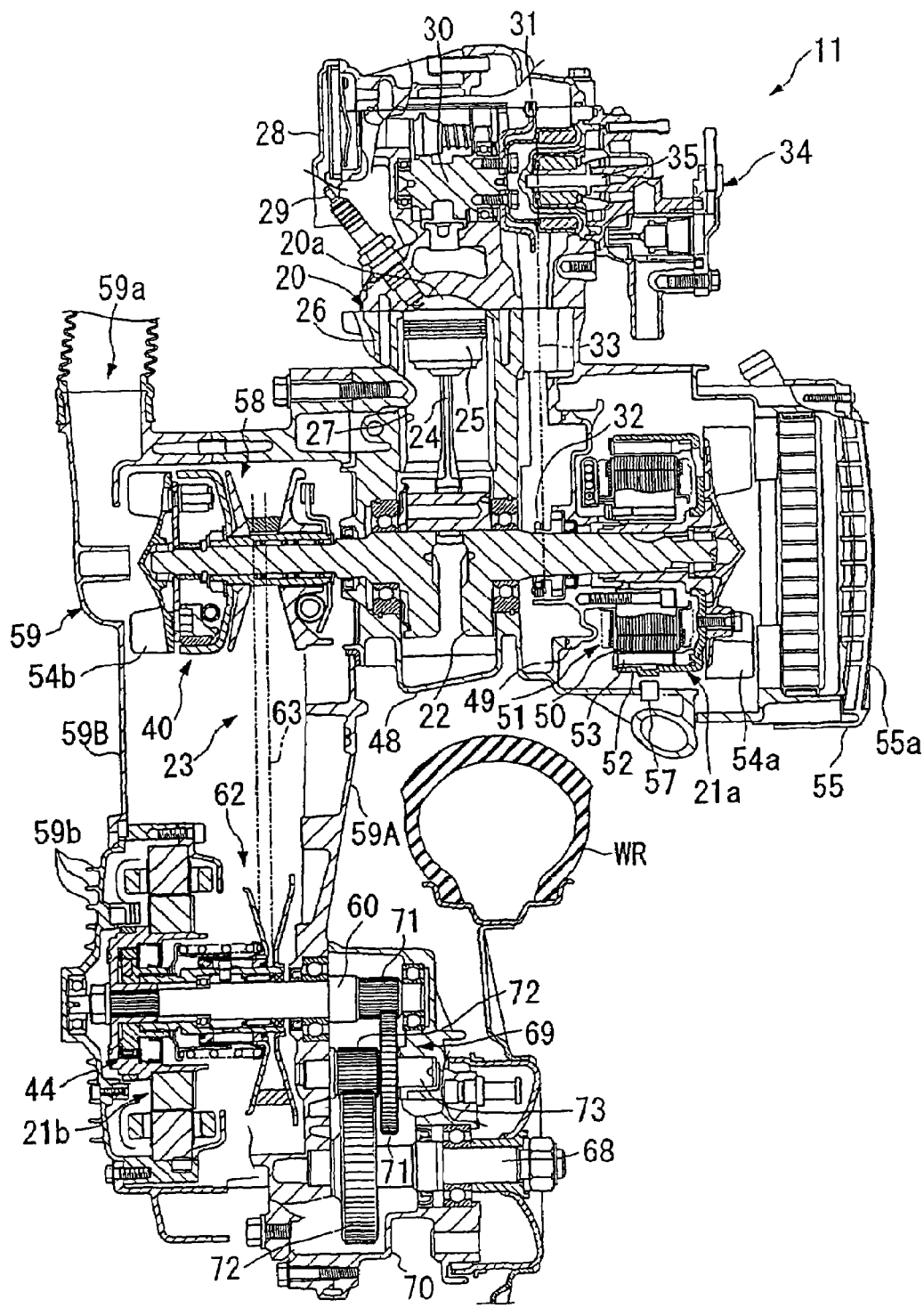
FIG. 3 is a cross-sectional view explaining a power unit of the motorcycle shown in FIG. 1.

As shown in FIG. 3, a piston 25 is connected to the crankshaft 22 of the engine 20 through a connecting rod 24. The piston 25 moves back and forth inside a cylinder 27 provided in a cylinder block 26. A combustion chamber 20a is formed of a cylinder head 28, the cylinder 27 and the piston 25.

In the cylinder head 28, an unillustrated valve for controlling suction or discharge of the air-fuel mixture into or from the combustion chamber 20a, and a spark plug 29 are provided. Opening and closing of the valve are controlled by the rotation of a camshaft 30 axially supported by the cylinder head 28. In a right end portion of the camshaft 30, a driven sprocket 31 is provided. An endless cam chain 33 is wound around the driven sprocket 31 and a drive sprocket 32 provided in a right end portion of the crankshaft 22. Thus, the camshaft 30 and the crankshaft 22 rotate in relationship to each other. To the right of the driven sprocket 31 of the camshaft 30, a water pump 34 is provided for circulating cooling water for the engine 20. A rotary shaft 35 of the water pump 34 is connected to the camshaft 30, and the water pump 34 is made to be operated by rotation of the camshaft 30.

A stator case 49 is connected to a right side of a crankcase 48 which axially supports the crankshaft 22. The ACG starter motor 21a is housed inside the stator case 49. The ACG starter motor 21a is a so-called outer rotor motor. Its stator includes coils 51 formed by winding conductors around teeth 50 fixed to the stator case 49. Meanwhile, an outer rotor 52 has an approximately cylindrical shape covering a periphery of the stator, and a magnet 53 is provided on an inner circumferential surface thereof. The outer rotor 52 is coaxially fixed to the crankshaft 22. A rotor sensor 57 is provided for detecting the rotation of the ACG starter motor 21a.

A fan 54a for cooling the ACG starter motor 21a is attached to the outer rotor 52. When the fan 54a rotates in synchronization with the crankshaft 22, air for cooling is taken in through a cooling air inlet 55a formed in a side face of a cover 55 of the stator case 49.

A metal power transmission case 59 is connected to a left side of the crankcase 48. A fan 54b fixed to a left end portion of the crankshaft 22, the starter clutch 40, the continuously variable transmission 23 having its input side connected to the crankshaft 22 through the starter clutch 40 and the drive motor 21b connected to the output side of the continuously variable transmission 23 are housed inside the power transmission case 59.

The drive motor 21b, the starter clutch 40 and the fan 54b are arranged to the left of the continuously variable transmission 23 in a vehicle width direction. A cooling air inlet 59a is formed on the left front of the power transmission case 59 and in the vicinity of the fan 54b. When the fan 54b rotates in synchronization with the crankshaft 22, outside air is taken into the power transmission case 59 through the cooling air inlet 59a, and the drive motor 21b and the continuously variable transmission 23 are forcibly cooled.

The drive motor 21b and the fan 54b are both arranged on the same side, with respect to the continuously variable transmission 23, in the power transmission case 59. Accordingly, when the fan 54b rotates together with the crankshaft 22, a vortex flow is generated in the power transmission case 59 by the rotation. Thus, the drive motor 21b with a large heating value is effectively cooled. Moreover, even during idle rotational such as when stopped at a red light without a driving wind, the drive motor 21b is forcibly cooled.

Moreover, here, the power transmission case 59 is divided into a case main body 59A which forms an inner side (right side) part thereof in the vehicle width direction, and a cover 59B which is attached from an outer side (left side) of the case main body 59A in the vehicle width direction. In the power transmission case 59, the starter clutch 40 and the drive motor 21b are arranged on the outer side (left side) in the vehicle width direction with respect to the continuously variable transmission 23. Accordingly, when the cover 59B of the power transmission case 59 is opened, the starter clutch 40 and the drive motor 21b can be exposed to the outside. Thus, the mountability and maintainability of these parts can be improved. Moreover, the starter clutch 40 and the drive motor 21b are arranged on the same side with respect to the continuously variable transmission 23. Thus, compared with the case where these parts are arranged on the both sides of the continuously variable transmission 23, the size in the vehicle width direction is controlled.

The continuously variable transmission 23 includes a drive side pulley 58 which is the input side and is mounted, through the starter clutch 40, on the left end portion of the crankshaft 22 projecting to the left in the vehicle width direction from the crankcase 48. A driven side pulley 62 is provided on the output side and is mounted, through the one-way clutch device 44, on the driven shaft 60 axially supported by the power transmission case 59 with an axis parallel to the crankshaft 22. The continuously variable transmission 23 is configured as a so-called belt converter formed by winding an endless V belt (endless belt) 63 around the pulleys described above. Here, the driven shaft 60 is provided while penetrating the drive motor 21b and the driven side pulley 62, and is rotatably supported by a gear case 70 housing the power transmission case 59 and the deceleration mechanism 69.

Figure 4:
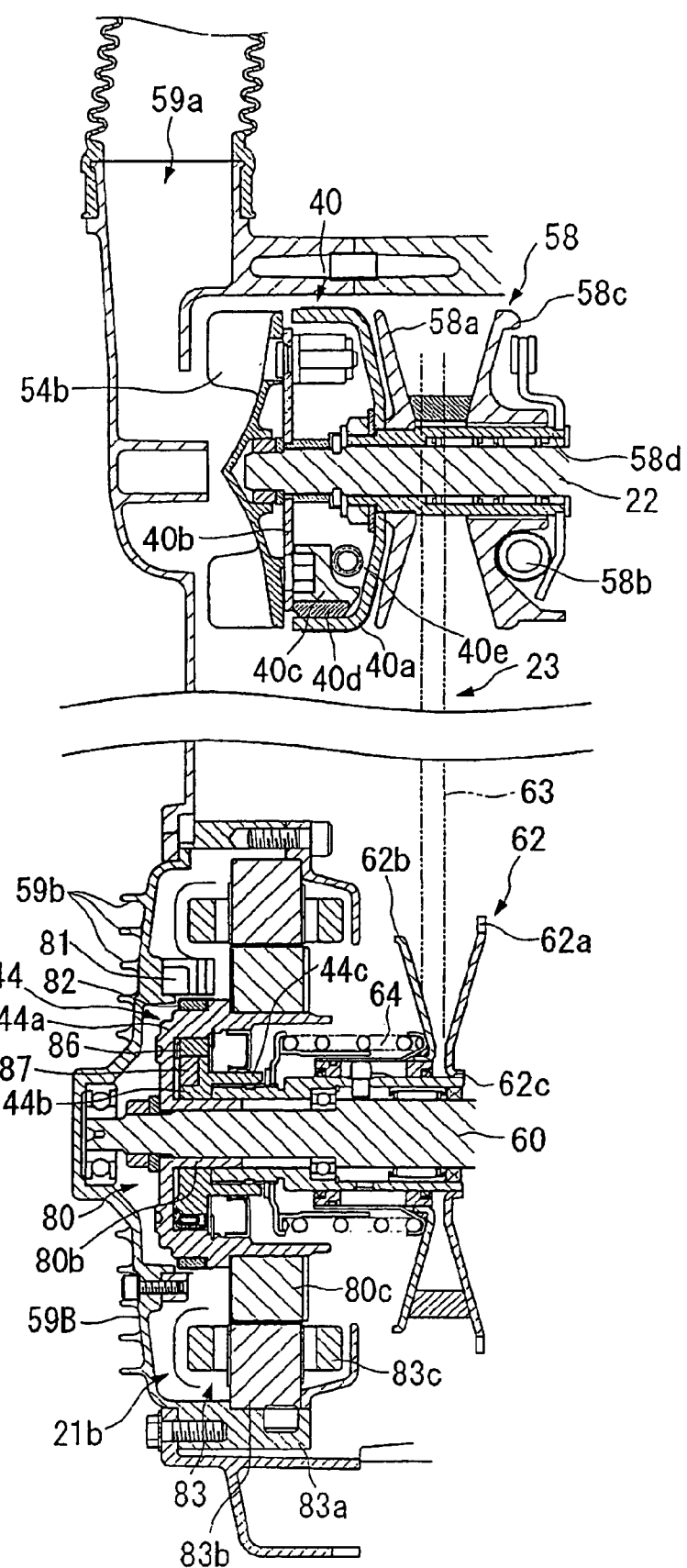
FIG. 4 is an enlarged view of a main part in FIG. 3.

In addition, with reference to FIG. 4, the drive side pulley 58 is mounted on the crankshaft 22 so as to be rotatable in a circumferential direction by means of a sleeve 58d through which the crankshaft 22 penetrates. The drive side pulley 58 is configured to include a drive side fixed pulley half 58a which is fixed on the sleeve 58d, and a drive side movable pulley half 58c which is attached to the sleeve 58d so as to be slidable in its axial direction and not to be rotatable in the circumferential direction.

On the other hand, the driven side pulley 62 is mounted on the driven shaft 60, which penetrates the driven side pulley 62, so as to be rotatable in the circumferential direction. The driven side pulley 62 is configured to include a driven side fixed pulley half 62a wherein sliding in the axial direction is controlled with respect to the driven shaft 60 and a driven side movable pulley half 62b which is attached on a boss part 62c, through which the driven shaft 60 penetrates. The driven side fixed pulley half 62a is slidable in the axial direction.

The endless V belt 63 is wound in belt grooves with approximately V-shaped cross sections, which are formed, respectively, between the drive side fixed pulley half 58a and the drive side movable pulley half 58c, and between the driven side fixed pulley half 62a and the driven side movable pulley half 62b.

On the backside (right side in the vehicle width direction) of the drive side movable pulley half, a weight roller 58b is provided. The centrifugal force of the rotation of the drive side pulley 58 acts on the weight roller 58b, and the weight roller 58b moves toward the periphery of the drive side pulley 58. Accordingly, the drive side movable pulley half 58c is made to slide toward the drive side fixed pulley half 58a side.

Meanwhile, on the backside (left side in the vehicle width direction) of the driven side movable pulley half 62b, a spring 64 is provided, which energizes the driven side movable pulley half 62b at all times toward the driven side fixed pulley half 62a side.

In the configuration described above, when the rotational speed of the crankshaft 22 is increased, in the drive side pulley 58, the centrifugal force acting on the weight roller 58b is increased, and the drive side movable pulley half 58c slides towards the drive side fixed pulley half 58a. The drive side movable pulley half 58c comes closer to the drive side fixed pulley half 58a for an amount of the sliding, and a groove width of the drive side pulley 58 is reduced. Accordingly, a contact position between the drive side pulley 58 and the V belt 63 shifts to the outside in a radial direction of the drive side pulley 58. Thus, a winding diameter of the V belt 63 is increased. Accordingly, in the driven side pulley 62, a width of the groove formed between the driven side fixed pulley half 62a and the driven side movable pulley half 62b is increased. Specifically, according to the rotational speed of the crankshaft 22, the winding diameter (transmission pitch diameter) of the V belt 63 is continuously changed, and a change gear ratio is automatically and continuously changed.

The starter clutch 40 is provided on the outer side (left side in this embodiment) in the vehicle width direction with respect to the continuously variable transmission 23, between the drive side fixed pulley half 58a and the fan 54b. The starter clutch 40 is in the vicinity of the cooling air inlet 59a formed in the power transmission case 59. This arrangement is in order to effectively and forcibly cool the starter clutch 40 by use of the outside air taken into the power transmission case 59 through the cooling air inlet 59a.

The starter clutch 40 includes a cup-shaped outer case 40a which is fixed to the sleeve 58d with an outer plate 40b which is fixed to the left end portion of the crankshaft 22 and a shoe 40d which is attached to an outer edge portion of the outer plate 40b by means of a weight 40c so as to face outward in the radial direction. A spring 40e is provided for energizing the shoe 40d inward in the radial direction.

In the configuration described above, when the rotational speed of the engine 20, that is, the rotational speed of the crankshaft 22 is not more than a predetermined value (a value, for example of 3,000 rpm, exceeding the idling rotational speed), the starter clutch 40 is set to be in a state of cutting off power transmission between the crankshaft 22 and the continuously variable transmission 23.

Accordingly, if the rotational speed of the engine 20 is increased, and the rotational speed of the crankshaft 22 exceeds the predetermined value, the centrifugal force acting on the weight 40c moves the weight 40c outwardly in the radial direction against the energizing force of the spring 40e acting inwardly in the radial direction. Thus, the shoe 40d presses an inner circumferential surface of the outer case 40a with a force of a predetermined value or more, and the crankshaft 22 is connected to the sleeve 58d through the starter clutch 40. Consequently, the rotary power of the crankshaft 22 is transmitted to the sleeve 58d through the starter clutch 40, and the drive side pulley 58 fixed on the sleeve 58d is driven to be rotated.

The one-way clutch device 44 is arranged in an inner rotor 80 of the drive motor 21b which is configured as an inner rotor type, coaxially with the inner rotor 80. The one-way clutch device 44 is arranged to be adjacent to the spring 64 in the vehicle width direction with the spring 64 being provided on the backside (left side in the vehicle width direction) of the driven side movable pulley half 62b.

This one-way clutch device 44 includes a cup-shaped outer clutch (output side rotating member) 44a with an inner clutch (input side rotating member) 44b which is coaxially inserted into the outer clutch 44a and a roller 86 and a weight member 87, which are provided between an inner circumference of the outer clutch 44a and an outer circumference of the inner clutch 44b.

In the inner clutch 44b, a cylindrical collar 44c is provided which projects rightwardly from a right side surface of the inner clutch 44b. An inner circumference of the collar 44c is spline-connected to an outer circumference of the boss part 62c which projects leftwardly from the driven side fixed pulley half 62a of the driven side pulley 62 that is the output side of the continuously variable transmission 23.

Moreover, the outer clutch 44a serves also as an inner rotor main body of the drive motor 21b, and is integrally formed with the inner rotor main body by use of the same member as that of the inner rotor main body. An inner circumference of a boss part of the inner rotor main body is spline-connected to an outer circumference of the driven shaft 60 to be the drive shaft of the rear wheel WR through the deceleration mechanism 69.

In the one-way clutch device 44, rotary power is transmitted from the inner clutch 44b to the outer clutch 44a in a state where, by actions of the roller 86 and the weight member 87, the inner clutch 44b receives the rotary power of the engine 20 and rotates at a rotational speed above a predetermined rotational speed, if the inner clutch 44b also relatively rotates in a direction of rotation by the rotary power of the engine 20 (hereinafter referred to as a normal rotational direction) with respect to the outer clutch 44a.

Meanwhile, if the inner clutch 44b rotates at the predetermined rotational speed or less, or if the inner clutch 44b relatively rotates in the direction opposite to the direction of rotation by the rotary power of the engine 20 (hereinafter referred to as a reverse rotational direction) with respect to the outer clutch 44a, the inner clutch 44b and the outer clutch 44a are allowed to run idle.

In other words, in the case where the inner clutch 44b rotates at the predetermined rotational speed or less, even when the inner clutch 44b and the outer clutch 44a relatively rotate in any direction, these clutches are allowed to run idle. In the case where the inner clutch 44b rotates at a rotational speed above the predetermined rotational speed, the one-way clutch device 44 functions as a one-way clutch capable of transmitting the rotary power only towards the rear wheel WR side from the engine 20 and the drive motor 21b according to the input rotational speed.

The drive motor 21b is provided so as to set the driven shaft 60, which is arranged parallel to the vehicle width direction, to be a motor output shaft in the rear side of the power transmission case 59. More specifically, the drive motor 21b sets the driven shaft 60, which is also an input shaft to the deceleration mechanism 69, to be the motor output shaft. This is in order to reduce power from the drive motor 21b by utilizing the deceleration mechanism 69 generally provided between the continuously variable transmission 23 and the rear wheel WR, and to transmit the power to the rear wheel WR. Thus, compared with a power unit of a motor direct connection type, which includes no deceleration mechanism 69 between the continuously variable transmission 23 and the rear wheel WR, it is possible to prevent an increase in the number of parts, which is caused by adding a deceleration mechanism and the like, or to miniaturize the drive motor 21b.

The inner rotor 80 is configured to include the inner rotor main body, that is, the inner clutch 44b, which is spline-connected to the driven shaft 60 by a cup-shaped boss part 80b formed in a center of the inner rotor 80 and a magnet 80c which is provided on an outer circumferential surface at an opening side of the inner clutch 44b. On an outer circumferential surface at a bottom side of the inner clutch 44b, a plurality of detected bodies 82 are mounted, which are detected by a rotor sensor 81 attached to an inner wall of the power transmission case 59.

Meanwhile, a stator 83 is configured with coils 83c which are formed by winding conductors around teeth 83b fixed to a stator case 83a in the power transmission case 59.

By including the above-described configuration, the drive motor 21b also functions as a generator which converts the rotation of the driven shaft 60 into electric energy and performs regenerative charging of the battery 74, in addition to functioning as a motor at the time of assisting the output of the engine 20.

Note that a PWM (Pulse Width Modulation) signal for controlling the drive motor 21b, and regenerative power are inputted/outputted from unillustrated terminals.

Moreover, the drive motor 21b is directly attached to an inner wall of the cover 59B of the power transmission case 59 with the stator case 83a interposed therebetween. Thus, a cooling effect that is achieved by an airflow during operation is enhanced by transmitting the generated heat from the drive motor 21b directly to an outer surface of the cover 59B. Moreover, on an outer wall of the cover 59B corresponding to the position of direct attachment of the drive motor 21b, a plurality of fins 59b are provided for cooling, which extend in an approximately longitudinal direction. The fins 59a are provided with intervals therebetween (see FIG. 1). Accordingly, the cooling performance by use airflow during operation of the vehicle is further improved by increasing a heat radiation area.

In a planar layout, the drive motor 21b is arranged on the outer side (left side) in the vehicle width direction with respect to the continuously variable transmission 23. In other words, the drive motor 21b is arranged opposite to the deceleration mechanism 69 with the continuously variable transmission 23 interposed therebetween. This is in order to arrange the drive motor 21b and the deceleration mechanism 69, which are heavy, by allocating those parts to positions in the vehicle width direction (left and right) with the continuously variable transmission 23 interposed therebetween.

Moreover, in the side view of the vehicle body shown in FIG. 1, the drive motor 21b is arranged so that the driven shaft 60 which is the output shaft of the drive motor 21b is positioned above the line L connecting the crankshaft 22 and an axle 68 of the rear wheel WR.

Furthermore, in the side view of the vehicle body shown in FIG. 1, the drive motor 21b is arranged so that the driven shaft 60 which is the output shaft of the drive motor 21b is positioned to be closer to the front of the vehicle body than the axle 68. This is in order to suppress the longitudinal length of the vehicle body as well as to arrange the longitudinal direction of the motor output shaft (the driven shaft 60) of the drive motor 21b so as to be parallel to the vehicle width direction.

The deceleration mechanism 69 is provided in the gear case 70 connected to the right side of the rear end of the power transmission case 59. This deceleration mechanism 69 is configured to include an intermediate shaft 73 axially supported to be parallel to the driven shaft 60 and the axle 68 of the rear wheel WR with a first pair of reduction gears 71 and 71 which are formed, respectively, in the right end portion of the driven shaft 60 and in a center portion of the intermediate shaft 73 and a second pair of reduction gears 72 and 72 which are formed, respectively, in a left end portion of the intermediate shaft 73 and in a left end portion of the axle 68.

According to the configuration described above, the rotational speed of the driven shaft 60 is reduced at a predetermined reduction gear ratio, and the rotation thereof is transmitted to the axle 68 of the rear wheel WR, which is axially supported to be parallel to the driven shaft 60.

The control unit 7, which performs the overall control of the engine 20, the ACG starter motor 21a and the drive motor 21b, is a control means that including a CPU (Central Processing Unit), a ROM (Read Only Memory), a RAM (Random Access Memory) and the like.

As shown in FIG. 2, this control unit 7 receives information from a throttle position sensor for detecting the opening of the throttle valve 17, the pressure sensor 19, the rotor sensors 57 and 81, and the like, and outputs predetermined control signals to the ACG starter motor 21a, respective drivers 8 and 9 of the drive motor 21b (see FIG. 1) and an ignition device which operates the spark plug 29 of the engine 20.

Next, the actions of the motorcycle 1A will be described.

First, when the engine 20 is started, the crankshaft 22 is rotated by use of the ACG starter motor 21a on the crankshaft 22. In this event, the starter clutch 40 is not connected, and power transmission to the continuously variable transmission 23 from the crankshaft 22 is cut off. Thereafter, the air-fuel mixture, sucked into the cylinder 27 in synchronization with the rotation of the crankshaft 22, is burned by use of the spark plug 29. Thus, the piston 25 is allowed to move back and forth, and at the same time, the crankshaft 22 is rotated.

In this event, if the rotational speed of the engine 20 is not more than the connection rotational speed of the starter clutch 40 (the predetermined value), such as at the time of idling, the engine 20 is made to be driven without driving the continuously variable transmission 23.

After the engine 20 is started as described above, when, in response to a manipulated variable of the throttle grip, the rotational speed of the engine 20 (and the rotational speed of the crankshaft 22) exceeds the predetermined value, the rotary power of the crankshaft 22 is transmitted to the drive side pulley 58 (the input side) of the continuously variable transmission 23 through the starter clutch 40, and is transmitted to the driven side pulley 62. Thus, the driven side pulley and the inner clutch 44b which rotates with the driven side pulley are rotated in the normal rotational direction.

Thereafter, if a rotational speed of the driven side pulley 62 and the inner clutch 44b, which is calculated by multiplying the rotational speed of the engine 20 by a reduction gear ratio of the continuously variable transmission 23, is not less than a predetermined value, the rotary power is transmitted from the inner clutch 44b to the outer clutch 44a in the one-way clutch device 44. Thus, the rotary power of the engine 20, which is transmitted to the continuously variable transmission 23, is transmitted from the one-way clutch device 44 to the rear wheel WR through the driven shaft 60 and the deceleration mechanism 69. Consequently, the motorcycle 1A starts moving and is operational.

Moreover, the motorcycle 1A can also start moving and operating only by use of the drive motor 21b, instead of the engine 20. In this event, the continuously variable transmission 23 is not driven, and the driven side pulley 62 and the inner clutch 44b stop their rotations. In addition, the inner clutch 44b relatively rotates in the reverse rotational direction with respect to the outer clutch 44a rotating with the inner rotor 80 of the drive motor 21b. Thus, the inner clutch 44b and the outer clutch 44a are allowed to run idle, and the rotary power of the drive motor 21b is not transmitted to the continuously variable transmission 23. Therefore, the continuously variable transmission 23 is not driven.

Furthermore, in the case of the starting and operating only by use of the engine 20, when a running load is large such as during an uphill operation and acceleration, in general, the rotary power may be given to the driven shaft 60 by the drive motor 21b having a large torque at a low engine speed, thus making it possible to assist driving by the engine. On the contrary, in the case of the starting and operating only by use of the drive motor 21b, it is also possible for the engine 20 to assist driving by the motor.

Furthermore, in the case of operating only by use of the drive motor 21b as a power source, such as during operation at a fixed speed (during cruise driving), even if the engine 20 is driven, as long as the rotational speed of the engine is not more than the connection rotational speed of the starter clutch 40 (the predetermined value), power generation by the ACG starter motor 21a can be performed by driving the engine 20 without driving the continuously variable transmission 23. In this event, as in the case described above, the rotary power of the drive motor 21b is transmitted to the rear wheel WR without driving the continuously variable transmission 23.

Moreover, during deceleration, when the throttle grip is released and the rotational speed of the crankshaft 22 reaches the predetermined value or less, the power transmission between the crankshaft 22 and the continuously variable transmission 23 is cut off by the starter clutch 40. Accordingly, the power transmission to the inner clutch 44b is also cut off to stop the rotation thereof. In addition, the inner clutch 44b is caused to relatively rotate in the reverse rotational direction with respect to the outer clutch 44a rotating through the driven shaft 60 along with the rotation of the rear wheel WR. Thus, the inner clutch 44b and the outer clutch 44a are allowed to run idle, and the rotation of the rear wheel WR is not transmitted to the continuously variable transmission 23. Accordingly, the continuously variable transmission 23 is not driven. Therefore, in a regenerative operation from the rear wheel WR to the drive motor 21b during deceleration, the rotary energy of the rear wheel WR is never consumed by drive of the continuously variable transmission 23.

In the case of pushing the motorcycle 1A when the engine 20 is idled or stopped, in first moving the vehicle body forward, the outer clutch 44a rotates in the normal rotational direction through the deceleration mechanism 69 and the driven shaft 60 by the rotation of the rear wheel WR. In this event, if the connection rotational speed of the starter clutch 40 exceeds the idling rotational speed of the engine 20, the inner clutch 44b receives no rotary power of the engine 20 and stops its rotation. Moreover, the inner clutch 44b relatively rotates in the reverse rotational direction with respect to the outer clutch 44a. Thus, the inner clutch 44b and the outer clutch 44a are allowed to run idle, and the continuously variable transmission 23 is not driven.

Moreover, in moving the vehicle body rearwardly, the outer clutch 44a rotates in the reverse rotational direction by the rotation of the rear wheel WR. Thus, the stopped inner clutch 44b relatively rotates in the normal rotational direction with respect to the outer clutch 44a. However, since the inner clutch 44b has stopped its rotation, as a result, the inner clutch 44b and the outer clutch 44a are allowed to run idle. Thus, as in the case of moving the vehicle body forward, the continuously variable transmission 23 is not driven. Accordingly, there occurs no influence of friction on the rear wheel WR due to the drive of the continuously variable transmission 23.

The motorcycle 1A according to the embodiment described above is a hybrid vehicle including the engine 20 which generates rotary power that is connected to the continuously variable transmission 23 which transmits the rotary power of the engine 20 to the rear wheel WR. The starter clutch 40 is provided that transmits the rotary power of the engine 20 to the drive side pulley 58 that is the input side of the continuously variable transmission 23, if a rotational speed of the engine 20 is not less than a predetermined value. The one-way clutch device 44 is provided in which the inner clutch 44b is connected to the driven side pulley 62 that is the output side of the continuously variable transmission 23. The outer clutch 44a is connected to the rear wheel WR through the driven shaft 60. The drive motor 21b is provided between the one-way clutch device 44 and the rear wheel WR and functions as a motor or a generator.

In a state where the inner clutch 44b rotates by the rotary power from the engine 20 at a rotational speed above a predetermined rotational speed, and if the inner clutch 44b relatively rotates in a direction of rotation by the rotary power of the engine 20 (the normal rotational direction) with respect to the outer clutch 44a, the one-way clutch device 44 transmits the rotary power from the inner clutch 44b to the outer clutch 44a. Meanwhile, if the inner clutch 44b rotates at the predetermined rotational speed or less, or if the inner clutch 44b relatively rotates in a direction opposite to the direction of rotation by the rotary power of the engine 20 (the reverse rotational direction) with respect to the outer clutch 44a, the inner clutch 44b and the outer clutch 44a are allowed to run idle.

Accordingly, if the rotational speed of the engine 20 is not more than the connection rotational speed of the starter clutch 40 (for example, during warming-up and the like), the continuously variable transmission 23 is not driven. Thus, reduction in fuel consumption can be achieved by reducing friction on the engine 20.

Moreover, in starting and operating only by use of the drive motor 21b, the drive motor 21b does not drive the continuously variable transmission 23. Thus, energy generated by the drive motor 21b can be efficiently transmitted, and a reduction in an amount of power used can be achieved.

Furthermore, power generation by the ACG starter motor 21a arranged coaxially with the crankshaft 22 of the engine 20 can be performed by driving the engine 20 without driving the continuously variable transmission 23. Thus, charging by the engine 20 can be efficiently performed, and high performance as the hybrid vehicle can be achieved.

Furthermore, the rotary energy of the rear wheel WR in a regenerative operation during deceleration is not consumed by drive of the continuously variable transmission 23. Thus, regenerative charging by the drive motor 21b can be efficiently performed, and a high performance as the hybrid vehicle can be achieved.

Since the motorcycle 1A can be pushed without driving the continuously variable transmission 23, good handleability in pushing the motorcycle can be achieved without the influence of friction in the continuously variable transmission 23.

Next, the one-way clutch device 44 will be described in detail.

Figure 5:
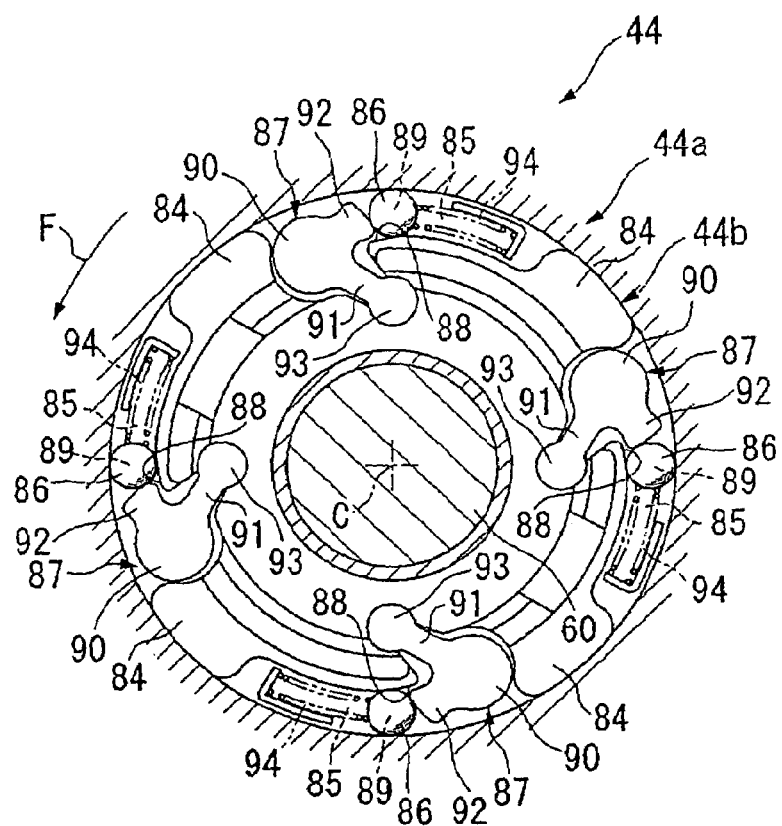
FIG. 5 is a side view of a one-way clutch device according to the embodiment of the present invention.

As shown in FIG. 5, in an outer circumferential portion of the inner clutch 44b, four convex parts 84 are formed to be evenly spaced apart in a circumferential direction of the one-way clutch device 44. More specifically, the convex parts 84 project outwardly in a radial direction and approximately match the inner circumferential surface of the outer clutch 44a. Between the respective convex parts 84 described above, gap parts 85 are formed, which have predetermined gaps between the outer circumference of the inner clutch 44b and the inner circumference of the outer clutch 44a. In the respective gap parts 85, the rollers 86 and the weight members 87 are provided, respectively.

In an approximately center portion in the circumferential direction of the one-way clutch device 44 in the respective gap parts 85, inclined planes 88 are formed, which are slightly inclined from a direction tangent to the outer circumference of the inner clutch 44b. Between the respective inclined planes 88 described above and the inner circumferential surface of the outer clutch 44a, wedge-shaped space parts 89 are formed, which are slightly wide on an upstream side of the direction of rotational (that is the normal rotational direction indicated by the arrow F in FIGS. 5 to 7) by the rotary power of the engine 20 in the one-way clutch device 44. In the respective wedge-shaped space parts 89 thus formed, the respective cylindrical rollers 86 are housed. The rollers 86 in a state of being housed in the wedge-shaped space parts 89 are arranged so as to have their axes parallel to a rotational axis C of the one-way clutch device 44. Moreover, the rollers 86 are held to be movable approximately along the circumferential direction of the one-way clutch device 44.

When the inner clutch 44b rotates in the normal rotational direction in a state where the respective rollers 86 are positioned on a downstream side of the normal rotational direction in the wedge-shaped space parts 89, the respective rollers 86 are fitted between the inner clutch 44b and the outer clutch 44a to connect these clutches. Accordingly, rotary power of the inner clutch 44b in the normal rotational direction can be transmitted to the outer clutch 44a. Moreover, when the inner clutch 44b rotates in a direction opposite to the normal rotational direction (the reverse rotational direction), the respective rollers 86 are not fitted therebetween. Accordingly, rotary power of the inner clutch 44b in the reverse rotational direction is not transmitted to the outer clutch 44a. Here, the fact that the rollers 86 are positioned on the downstream side of the normal rotational direction in the wedge-shaped space parts 89 means that the rollers 86 are located at positions where the rollers 86 allow a connection between the inner clutch 44b and the outer clutch 44a.

In areas on the upstream side in the normal rotational direction of the respective rollers 86, weight main bodies 90 of the weight members 87 are provided, respectively. Here, each of the weight members 87 includes the weight main body 90 which comes into contact with the corresponding roller 86 and an arm part 91 which is connected to the weight main body 90 and is rotatably supported by the inner clutch 44b. Note that, in this embodiment, the weight main body 90 and the arm part 91 are integrally formed by use of the same member.

In the side view shown in FIG. 5, the weight main body 90 is formed to have an approximately circular shape. This weight main body 90 is disposed in a housing part, which is formed by slightly cutting a portion on the upstream side in the normal rotational direction of the gap part 85, so as to match the housing part. In a portion of the weight member 87 on the roller 86 side, a contact part 92 having an approximately rectangular shape is provided that projects therefrom. This contact part 92 obliquely comes into contact with the roller 86. In a state where each of the rollers 86 is pressed towards the contact part 92, a space S is formed between the roller 86 and the outer circumferential surface (the inclined plane 88) of the inner clutch 44b (see FIG. 6).

In the side view shown in FIG. 5, the arm part 91 obliquely extends along the radial direction from the outer circumference of the weight main body 90, inward in the radial direction in the inner clutch 44b, and towards the downstream side in the normal rotational direction. A tip portion 93 of the arm part 91 swells to have an approximately circular shape smaller than that of the weight main body 90. This tip portion 93 engages with an engagement concave portion which is formed so as to cut a part of the outer circumferential portion of the inner clutch 44b, so as to be rotatable around an axis parallel to the rotational axis C of the one-way clutch device 44.

A portion on the downstream side in the normal rotational direction of the weight member 87 in the inner clutch 44b is appropriately cut off so as not to interfere with the arm part 91 when the arm part 91 rotates. Thus, in the side view described above, the weight member 87 can be operated so as to swing the weight main body 90 around the tip portion 93 of the arm part 91.

In portions on the downstream side in the normal rotational direction of the respective rollers 86, coil springs (elastic members) 94 are arranged, respectively, which are held by guide members fixed to the outer circumference of the inner clutch 44b. The respective coil springs 94 described above energize the corresponding rollers 86 towards the upstream in the normal rotational direction. Thus, each of the rollers 86 is energized in a direction moving away from a position on the downstream side in the normal rotational direction in the wedge-shaped space part 89, that is, the position where each of the rollers 86 allows the connection between the inner clutch 44b and the outer clutch 44a.

Figure 6:
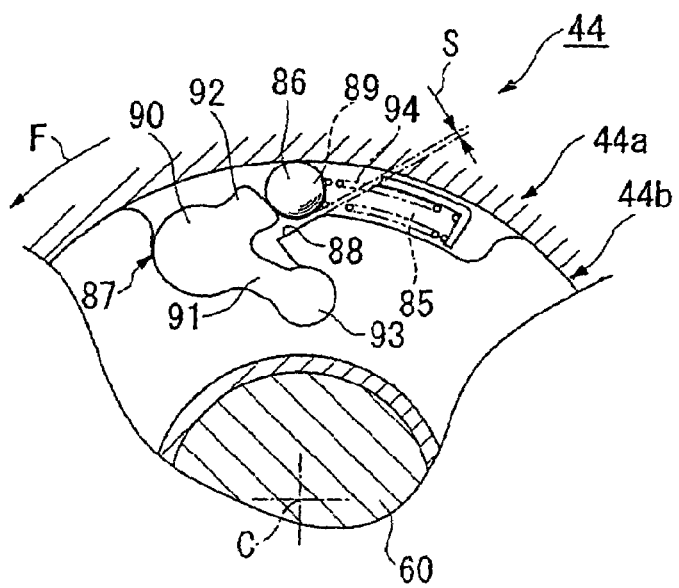
FIG. 6 is an explanatory view of a first action, showing an operation of the one-way clutch device while enlarging a main part in FIG. 5.

As shown in FIG. 6, the roller 86 energized by the coil spring 94 is pressed against the contact part 92 of the weight main body 90 in a state where the roller 86 is in contact with the contact part 92. Accordingly, the roller 86 stops in a state where the space S is formed between the roller 86 and the outer circumferential surface (the inclined plane 88) of the inner clutch 44b. In this event, the weight member 87 stops in a state where its portion on the upstream side in the normal rotational direction is allowed to abut against the wall surface of the inner clutch 44b. This state will be hereinafter referred to as a state before operation of the weight member 87. Even if the inner clutch 44b rotates in the normal rotational direction or in the reverse rotational direction in the state described above, the respective rollers 86 are not fitted between the inner clutch 44b and the outer clutch 44a. Thus, the rotary power of the inner clutch 44b is not transmitted to the outer clutch 44a.

During rotation of the inner clutch 44b, the centrifugal force causes the weight main bodies 90 of the respective weight members 87 rotating with the inner clutch 44b to move outwardly in the radial direction of the inner clutch 44b. Here, due to a positional relationship with the tip portion 93 of the arm part 91, the tip portion 93 being the center of the swinging of the weight main body 90, the weight main body 90 comes to swing so as to move outwardly in the radial direction of the one-way clutch device 44 and toward the downstream side in the normal rotational direction.

In this event, the respective weight main bodies 90 are in a state of being pressed against the wall surface of the inner clutch 44b by elastic force of the coil springs 94. Thus, if the rotational speed of the inner clutch 44b is low, and the centrifugal force acting on the respective weight main bodies 90 is small, the respective weight main bodies 90 do not move against the elastic force of the coil springs 94. Accordingly, each of the weight members 87 rotates together with the inner clutch 44b, as it is in the state before operation. In this state, the respective rollers 86 remain away from the position where the respective rollers 86 allow the connection between the inner clutch 44b and the outer clutch 44a. Therefore, even if the inner clutch 44b and the outer clutch 44a relatively rotate in any direction, the inner clutch 44b and the outer clutch 44a are allowed to run idle.

As the rotational speed of the inner clutch 44b is increased, the centrifugal force acting on the weight main body 90 is increased. If the rotational speed of the inner clutch 44b exceeds a predetermined value, the weight main body 90 moves against the elastic force of the coil spring 94. Thus, the respective rollers 86 are allowed to move to the position where the respective rollers allow the connection between the inner clutch 44b and the outer clutch 44a.

Figure 7:
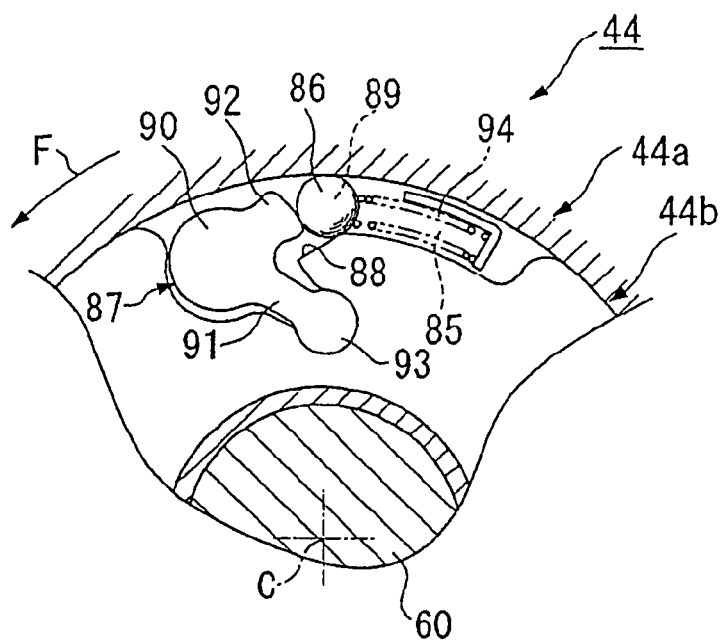
FIG. 7 is an explanatory view of a second action, showing an operation of the one-way clutch device while enlarging the main part in FIG. 5.
Figure 8:
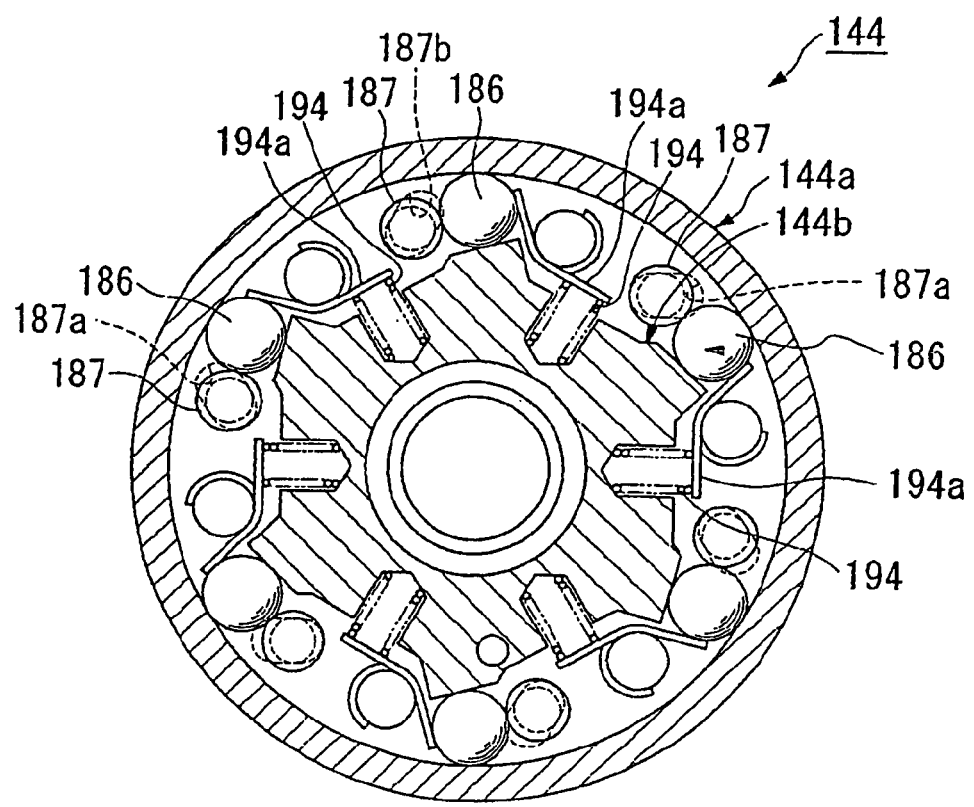
FIG. 8 is a side view showing a conventional one-way clutch device.

FIG. 7 shows a state where the weight member 87 has operated so as to swing the weight main body 90, changing from the state before the operation thereof. In this state, the weight main body 90 swings so as to move, from its position in the state before the operation of the weight member 87, outwardly in the radial direction of the one-way clutch device 44 and towards the downstream side in the normal rotational direction. The weight main body 90 thus moved causes the roller 86 to move against the elastic force of the coil spring 94 towards a position on the downstream side in the normal rotational direction in the wedge-shaped space part 89, that is, the position where the roller 86 allows the connection between the inner clutch 44b and the outer clutch 44a. In this event, the space S becomes zero, and the inner clutch 44b rotates in the normal rotational direction. Thus, the roller 86 is fitted between the inner clutch 44b and the outer clutch 44a to connect these clutches.

The one-way clutch device 44 according to the embodiment described above includes the inner clutch 44b and the outer clutch 44a, which are arranged coaxially with each other, and the rollers 86 provided therebetween. In a state where the inner clutch 44b rotates at a rotational speed above a predetermined rotational speed, and if the inner clutch 44b relatively rotates in the direction of rotation by the rotary power of the engine 20 with respect to the outer clutch 44a, the one-way clutch device 44 is configured to transmit the rotary power from the inner clutch 44b to the outer clutch 44a by connecting these clutches by means of the rollers 86.

Moreover, the weight members 87 are provided in the inner clutch 44b. Each of the weight members 87 includes the weight main body 90 which comes into contact with the roller 86, and the arm part 91 which is connected to the weight main body 90 and is rotatably supported by the inner clutch 44b. If the inner clutch 44b rotates at a rotational speed above the predetermined rotational speed, the weight member 87 is made to move the roller 86 to the position where the roller 86 allows the connection between the inner clutch 44b and the outer clutch 44a.

Accordingly, the weight main body 90 can be swung by the centrifugal force during rotation of the inner clutch 44b by means of the arm part 91 with respect to the inner clutch 44b. If the inner clutch 44b rotates at a rotational speed above the predetermined rotational speed, the swung weight main body 90 can move the roller 86 to the position where the roller 86 allows the connection between the inner clutch 44b and the outer clutch 44. Thus, the one-way clutch device 44 can be allowed to function as a one-way clutch. If the inner clutch 44b relatively rotates in a specific direction with respect to the outer clutch 44a in this state, the rotary power is transmitted from the inner clutch 44b to the outer clutch 44a.

Here, the weight member 87 operates so as to swing the weight main body 90 with respect to the inner clutch 44b. Accordingly, compared with the conventional one-way clutch device 44 having a configuration in which auxiliary rollers 86 are moved along oblong holes, a smooth operation of the weight member 87 can be maintained without causing the weight member 87 to fall off from the inner clutch 44b even during long-term use.

Thus, the durability of the one-way clutch device 44 can be improved. Moreover, compared with the conventional configuration using the auxiliary rollers 86, it is possible to eliminate a configuration of preventing the fall-off of the weight member 87 which helps to provide a smooth operation thereof. Thus, a reduction in manufacturing costs of the one-way clutch device 44 can be achieved.

Moreover, the one-way clutch device 44 includes the coil springs 94 which energizes the rollers 86 in the direction moving away from the position where the rollers 86 allow the connection between the inner clutch 44b and the outer clutch 44a. If the inner clutch 44b rotates at a rotational speed above the predetermined rotational speed, the weight member 87 moves the roller 86 against the elastic force of the coil spring 94.

Accordingly, in a state where the rotational speed of the inner clutch 44b is low, the centrifugal force during rotation of the inner clutch 44b is small. Therefore, the weight member 87 cannot move the roller 86 against the elastic force of the coil spring 94. Accordingly, the roller 86 remains away from the position where the roller 86 allows the connection between the inner clutch 44b and the outer clutch 44a. Thus, even if the inner clutch 44b and the outer clutch 44a relatively rotate in any direction, these clutches can be allowed to run idle. Moreover, if the inner clutch 44b rotates at a rotational speed above the predetermined rotational speed, the swung weight main body 90 can move the roller 86 against the elastic force of the coil spring 94. Thus, the one-way clutch device 44 can be allowed to function as a one-way clutch.

Note that the present invention is not limited to the embodiment described above. For example, a power transmission medium other than the belt converter (the continuously variable transmission 23) may be used. Moreover, the attachment position of the drive motor 21b is not limited to the rear wheel WR side, but may be on the front wheel WF side. Furthermore, instead of the unit swing type power unit 11, a power unit may be used having a configuration in which an engine is fixed to a vehicle body frame and only a portion on the rear wheel WR side from a power transmission medium swings.

Moreover, the one-way clutch device 44 may have a configuration in which the outer clutch 44a is set as the input side rotating member, and the inner clutch 44b is set as the output side rotating member. In this case, the rollers 86 and the weight members 87 are provided in the outer clutch 44a.

The configuration according to the embodiment described above is an example. The present invention is applicable not only to the hybrid vehicle but also to a motorcycle having a single power source. Moreover, various changes in design can be made without departing from the scope of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A one-way clutch device comprising:
an input side rotating member and an output side rotating member, being arranged coaxially with each other;
rollers provided between the rotating members with the one-way clutch device transmitting rotary power from the input side rotating member to the output side rotating member by connecting both members to each other by means of the rollers, in a state where the input side rotating member rotates at a rotational speed above a predetermined rotational speed, and if the input side rotating member relatively rotates in a specific direction with respect to the output side rotating member; and weight members being provided in the input side rotating member, each of the weight members having a weight main body coming into contact with the roller, and an arm part connected to the weight main body and rotatably supported by the input side rotating member;

wherein if the input side rotating member rotates at a rotational speed above the predetermined rotational speed, the weight members move the rollers to positions where the rollers allow a connection between the input side rotating member and the output side rotating member.

2. The one-way clutch device according to claim 1, and further comprising:

elastic members for energizing the rollers in a direction moving away from the positions where the rollers allow a connection between the input side rotating member and the output side rotating member;

wherein, if the input side rotating member rotates at a rotational speed above the predetermined rotational speed, the weight members move the rollers against elastic force of the elastic members.

3. The one-way clutch device according to claim 1, wherein said inner side rotating member includes at least four evenly spaced convex parts projecting outwardly in a radial direction for approximately matching an inner circumferential surface of the output side rotating member.

4. The one-way clutch device according to claim 3, wherein said at least four evenly spaced convex parts form gap parts between an outer circumferential surface of the input side rotating member and the inner circumferential surface of the output side rotating member, said rollers and the weight members being received within respective gap parts.

5. The one-way clutch device according to claim 1, wherein said rollers are cylindrical rollers.

6. The one-way clutch device according to claim 1, wherein the weight members include a contact part projecting therefrom for engaging respective rollers, and an inclined plane being formed on an outer circumferential surface of said input side rotating member, wherein a biasing member normally biases respective rollers to be out of engagement with said inclined plane and wherein if the input side rotating member rotates at the rotational speed above the predetermined rotational speed, the contact part of the weight members move the rollers to positions where the rollers are in engagement with said inclined plane to allow a connection between the input side rotating member and the output side rotating member.

7. The one-way clutch device according to claim 6, wherein said arm part of said weight members includes a tip portion that is rotatably supported by the input side rotating member to enable said contact part of the weight members to swing so as to move outwardly in a radial direction to displace respective rollers when the rotational speed above the predetermined rotational speed so that the weight members move the rollers to positions where the rollers allow a connection between the input side rotating member and the output side rotating member.

8. The one-way clutch device according to claim 6, wherein the biasing member is a spring for normally biasing the rollers out of engagement with the inclined plane.

9. The one-way clutch device according to claim 6, wherein the rollers are cylindrical rollers.

10. The one-way clutch device according to claim 1, wherein the rollers are movable within oblong holes formed in the input side rotating member for enabling a smooth operation of the weight members to be maintained without causing the weight members to fall off the input side rotating member.

11. A motorcycle including a motor for outputting rotary power, a power transmission medium for transmitting the rotary power of the motor to a drive wheel, a starter clutch for transmitting the rotary power of the motor to an input side of the power transmission medium if a rotational speed of the motor is not less than a predetermined value, and a one-way clutch device having an input side rotating member connected to an output side of the power transmission medium, and an output side rotating member connected to the drive wheel;

wherein the one-way clutch device transmits the rotary power from the input side rotating member to the output side rotating member, in a state where the input side rotating member rotates by the rotary power from the motor at a rotational speed above a predetermined rotational speed, and if the input side rotating member relatively rotates in a direction of rotation by the rotary power of the motor with respect to the output side rotating member; and wherein the one-way clutch device allows the input side rotating member and the output side rotating member to run idle, in any of the cases where the input side rotating member rotates at not more than the predetermined rotational speed and where the input side rotating member relatively rotates in a direction opposite to the direction of rotation by the rotary power of the motor with respect to the output side rotating member, wherein the one-way clutch includes:

rollers provided between the rotating members with the one-way clutch device transmitting rotary power from the input side rotating member to the output side rotating member by connecting both members to each other by means of the rollers, in a state where the input side rotating member rotates at a rotational speed above a predetermined rotational speed, and if the input side rotating member relatively rotates in a specific direction with respect to the output side rotating member;

weight members being provided in the input side rotating member, each of the weight members having a weight main body coming into contact with the roller, and an arm part connected to the weight main body and rotatably supported by the input side rotating member; and elastic members for energizing the rollers in a direction moving away from the positions where the rollers allow a connection between the input side rotating member and the output side rotating member;

wherein, if the input side rotating member rotates at a rotational speed above the predetermined rotational speed, the weight members move the rollers against elastic force of the elastic members.

12. The motorcycle according to claim 11, wherein said inner side rotating member includes at least four evenly spaced convex parts projecting outwardly in a radial direction for approximately matching an inner circumferential surface of the output side rotating member.

13. The motorcycle according to claim 12, wherein said at least four evenly spaced convex parts form gap parts between an outer circumferential surface of the input side rotating member and the inner circumferential surface of the output side rotating member, said rollers and the weight members being received within respective gap parts.

14. The motorcycle according to claim 11, wherein said rollers are cylindrical rollers.

15. The motorcycle according to claim 11, wherein the weight members include a contact part projecting therefrom for engaging respective rollers, and an inclined plane being formed on an outer circumferential surface of said input side rotating member, wherein the elastic members normally bias respective rollers to be out of engagement with said inclined plane and wherein if the input side rotating member rotates at the rotational speed above the predetermined rotational speed, the contact part of the weight members move the rollers to positions where the rollers are in engagement with said inclined plane to allow a connection between the input side rotating member and the output side rotating member.

16. The motorcycle according to claim 15, wherein said arm part of said weight members includes a tip portion that is rotatably supported by the input side rotating member to enable said contact part of the weight members to swing so as to move outwardly in a radial direction to displace respective rollers when the rotational speed above the predetermined rotational speed so that the weight members move the rollers to positions where the rollers allow a connection between the input side rotating member and the output side rotating member.

17. The motorcycle according to claim 15, wherein the elastic members are springs for normally biasing the rollers out of engagement with the inclined plane.

18. The motorcycle according to claim 15, wherein the rollers are cylindrical rollers.

19. The motorcycle according to claim 11, wherein the rollers are movable within oblong holes formed in the input side rotating member for enabling a smooth operation of the weight members to be maintained without causing the weight members to fall off the input side rotating member.

20. A one-way clutch device comprising:

inner and outer side rotating members arranged coaxially with each other;

rollers provided between the inner and outer side rotating members and configured to be moved into a position to connect the input and output side rotating members together when the input side rotating member rotates at a rotational speed above a predetermined rotational speed;

weight members included in a housing part of the inner side rotating member, each weight members having a weight main body coming into contact with the roller and an arm part connected to the weight main body and rotatably supported by the inner side rotating member;

wherein when the inner side rotating member rotates at the rotational speed above the predetermined rotational speed, the weight members move in a direction opposite to a rotating direction of the inner side rotating member due to a centrifugal force caused by the inner side rotating member so as to move the rollers to connect the outer and inner rotating members, and when the inner side rotating member does not rotate at the rotational speed above the predetermined rotational speed, the weight member remains in place such that the rollers do not connect the outer and inner side rotating members.

* * * * *